United States Patent [19]

Forrester et al.

[11] Patent Number: 5,398,282
[45] Date of Patent: Mar. 14, 1995

[54] AUTOMATIC SIDETONE SELECTOR

[75] Inventors: Christopher M. Forrester, Ottawa; David A. Pepper, Kemptville; Guy J. Fortier; Norbert J. Diesing, both of Kanata; W. J. Leonard McCready, Carp, all of Canada

[73] Assignee: Northern Telecom Limited, Montreal, Canada

[21] Appl. No.: 40,850

[22] Filed: Mar. 31, 1993

[30] Foreign Application Priority Data

Dec. 31, 1992 [CA] Canada .................................. 2086573

[51] Int. Cl.$^6$ ............................................. H04M 1/00
[52] U.S. Cl. ..................... 379/391; 379/410; 379/407; 379/406; 379/390
[58] Field of Search ............... 379/391, 392, 390, 410, 379/407

[56] References Cited

U.S. PATENT DOCUMENTS

| | | | |
|---|---|---|---|
| 4,996,710 | 2/1991 | Takahashi et al. | 379/202 |
| 5,029,203 | 7/1991 | Ikefuji et al. | 379/391 |
| 5,133,007 | 7/1992 | Nishimura | 379/405 |
| 5,191,606 | 3/1993 | Juang | 379/391 |

Primary Examiner—James L. Dwyer
Assistant Examiner—Jacques M. Saint-Surin
Attorney, Agent, or Firm—Michael M. Sakovich

[57] ABSTRACT

Sidetone in a four-wire telephone station set that is coupled to a two-wire telephone line through a four-to-two wire hybrid circuit is automatically and cancel the phase "to a predetermined value", set by incrementally adjusting a balancing impedance connected to the circuit until an optimum impedance match between the telephone set and line is achieved. Under software control, during idle intervals between dialed digits when a call is initiated, a microcontroller mutes the telephone transmitter and receiver on the telephone side of the circuit and substitutes for these components a tone signal generator to produce a sidetone signal that is applied to a full-wave rectifier and therefrom to a peak voltage detector to generate a sidetone envelope. Individual ones of several impedance balancing networks are then sequentially connected to the telephone side of the circuit and the sidetone envelope for each balancing impedance is digitally encoded and stored. A mutual comparison of the stored data indicates a minimum sidetone value which corresponds to an optimum impedance match that is retained unless a subsequent telephone call results in a change of balancing impedance.

22 Claims, 3 Drawing Sheets

AUTOMATIC SIDETONE SELECTOR

FIELD OF THE INVENTION

The present invention relates to apparatus and a method for objectively adjusting sidetone in a telephone subscriber's station set and more particularly to apparatus and a method for automatically adjusting the sidetone to a predetermined value.

BACKGROUND OF THE INVENTION

Sidetone is the reproduction of acoustic signals in a telephone receiver corresponding to voice signals generated by the transmitter of the same telephone set. The sidetone signal results from a portion of the transmitted signal being coupled to the receiver by way of a four-to-two wire hybrid circuit which is a differential balance circuit that permits voice signals to be transmitted and received via amplifying circuits connected to the same telephone line without in any way adversely affecting one another.

The presence of some sidetone is considered desirable as an indication of a properly functioning set and indeed produces the expected normal condition of hearing one's own voice when speaking. An adverse condition may develop, however, should the sidetone level become excessive. Such condition degrades the transmission quality by inherently causing a talker to reduce speech levels. For a listener in a noisy environment, high sidetone levels result in reduced signal-to-noise ratios that mask incoming receive signals by acoustic noise coupled through the transmitter.

Sidetone level in a telephone set is determined by five operational parameters:
1. transmit sensitivity;
2. receive sensitivity;
3. impedance of the telephone set, i.e., the impedance measured looking into the line terminals of the telephone set;
4. impedance for minimum sidetone, i.e., the impedance connected to the line terminals of the telephone set which causes the sidetone to completely vanish; and
5. near end input impedance of the telephone connection, i.e., the impedance measured looking into the telephone line from the telephone set.

The first four parameters represent variables coming under discretionary control of a telephone set designer. Of these parameters, only the fourth may be varied freely to control sidetone performance of the telephone set since the first three parameters must normally be chosen to achieve satisfactory voice transmission performance in the system.

The fifth parameter is highly variable and depends upon the topology of a telephone connection which is influenced by the length and gauge of telephone cables, the presence of loading coils and their spacing, the presence of bridge-taps and the far end termination of the telephone line.

The variable nature of telephone connections, which can be unpredictable, places reliance on the fourth parameter which is a controllable factor through which minimum sidetone may be obtained so as to provide the best possible sidetone performance over an expected wide range of telephone connections.

SUMMARY OF THE INVENTION

Having regard to the aforedescribed problems relating to the control of sidetone signal levels in a telephone set, one provision of the present invention is to provide apparatus, and a method utilizing such apparatus, that will automatically adjust a sidetone signal to a predetermined reference level.

Another provision of the invention is to control sidetone levels in the telephone set by incrementally adjusting a sidetone balance impedance in the set to match a telephone line connecting the set to a central office.

A further provision of the invention is to adjust the balance impedance for each occurrence of call initiation at the telephone set.

The problems associated with the prior art may be substantially overcome and the foregoing provisions achieved by recourse to the invention which, in one aspect thereof, relates to apparatus for adjusting sidetone in a telephone set including a transmitter and a receiver connected to a telephone side of a hybrid balance circuit having a line side connected to a telephone central office. The apparatus comprises, in combination, a tone signal generator having a predetermined operating frequency, detection means for measuring a peak signal amplitude, means for incrementally adjusting a balancing impedance in the set for matching a telephone line connecting the line side of the balance circuit to the central office, and means for muting the transmitter and receiver and substituting therefor the signal generator and the detection means for measuring a received sidetone signal corresponding to a relative sidetone value for each incremental impedance adjustment.

Another aspect of the invention relates to a method for adjusting sidetone in a telephone station set including a transmitter and a receiver connected to a telephone side of a hybrid balance circuit having a line side connected to a telephone central office. The method comprises the steps of, muting the transmitter and receiver, applying a tone signal of predetermined frequency to the telephone side of the balance circuit, incrementally adjusting a balancing impedance in the set for matching a telephone line connecting the line side of the balance circuit to the central office, and measuring the peak amplitude of a receive envelope corresponding to a relative sidetone value for each incremental impedance adjustment.

BRIEF DESCRIPTION OF THE DRAWINGS

The invention will now be more particularly described with reference to embodiments thereof shown, by way of example, in the accompanying drawings in which.

DETAILED DESCRIPTION OF THE PREFERRED EMBODIMENTS

The embodiments of the invention hereinbelow disclosed rely on block diagrams to describe certain apparatus and various circuit elements together with their respective functions. Similarly, software functions are depicted in a flow diagram showing predetermined functional steps that are followed to achieve desired performance from the apparatus described. These diagrams represent certain hardware and software features that would be known to those skilled in the art to whom this specification is addressed, although not in the novel combinations disclosed. Accordingly, the following constitutes a sufficient description to such individuals for a comprehensive understanding of the best mode to give effect to the embodiments as disclosed and claimed herein. Although program listings have not been included to disclose the precise manner of digital computer programming to perform the operations desired, the detailed functional description presented herein, together with the related flow diagram, would permit a skilled computer programmer to program a personal computer, microprocessor, microcontroller, and the like, to perform all of the operations described.

Figure 1:
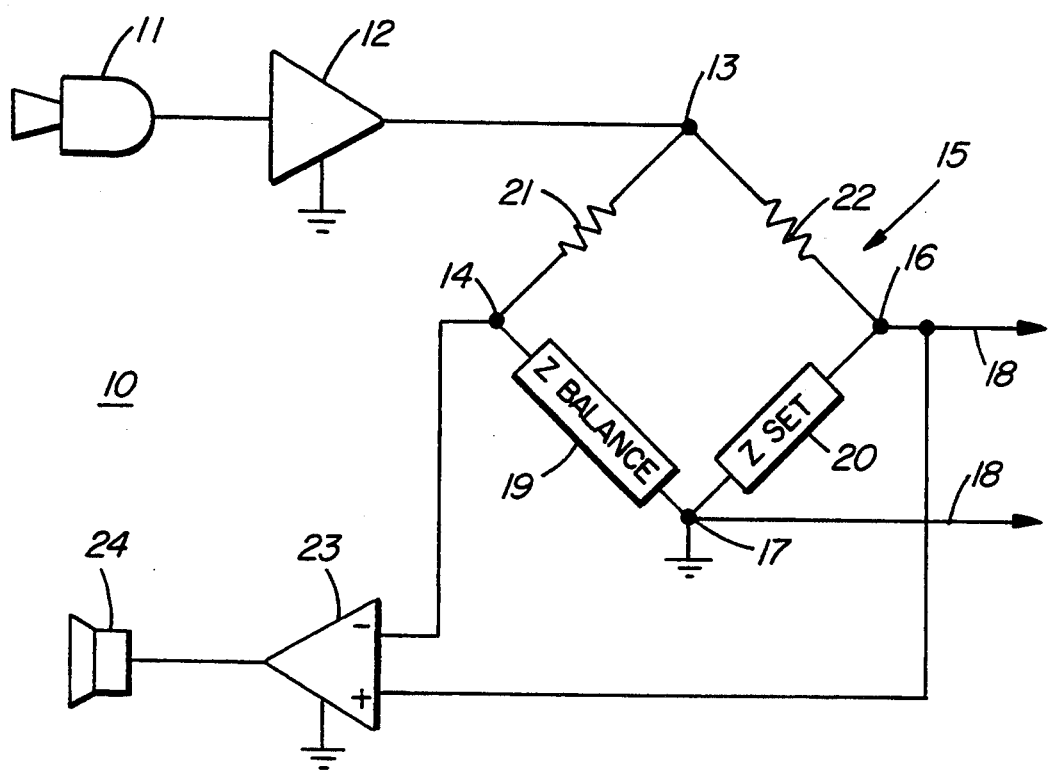
FIG. 1 is a schematic diagram of a known four-to-two wire hybrid balance circuit connecting a four-wire telephone set to a two-wire telephone line.

FIG. 1 is a schematic diagram of a four-wire terminating set 10 that is well known and commonly employed in the prior art to connect a four-wire telephone set to a two-wire telephone line. The set 10 includes a microphone circuit that comprises a transmitter 11 which generates voice signals that are amplified by a transmitter amplifier 12 having an output connected across a pair of signal source terminals 13 and 17 of a known balancing bridge circuit 15 used in telephony. Voice signals from the amplifier 12 are conducted through the various arms of the circuit 15 as illustrated, and appear across a pair of line terminals 16 and 17 to which a two-wire telephone line 18 is connected.

Balance of the circuit 15 is achieved when the amplified voice signals from the amplifier 12 appear across a pair of signal receive terminals 14 and 16 in equal amplitude and phase relation. Thus, balance occurs when a balance impedance 19 is equal to the value of a telephone set impedance 20 connected in parallel with the impedance of a telephone loop, a variable value, multiplied by the ratio of two balancing resistors 21 and 22. This is expressed by the balancing equation:

$$Z \text{ balance} = \frac{Z \text{ set} \cdot Z \text{ loop}}{Z \text{ set} + Z \text{ loop}} \times \frac{R21}{R22}$$

At balance, voice signals appearing at the terminals 14 and 16 are coupled to corresponding inputs of a differential amplifier 23 that drives a telephone receiver 24. The result is cancellation of the input signals within the amplifier 23 which precludes the appearance of a sidetone signal at the receiver 24.

Under less-than ideal conditions, cancellation of the voice signals in the receiver circuit is not complete, resulting in a sidetone signal which, under certain controlled conditions, is known to be desirable. The presence of the sidetone signal becomes undesirable, however, when it becomes too high as hereinbefore described.

Normally, a proper balance of the set 10 with the line 18 is obtained by connecting the balancing impedance 19 across the terminals 14 and 17 as disclosed, with the impedance 19 value being determined by the aforedescribed balancing equation. But, since the impedance of the line 18 is subject to wide variations due to variable factors such as differences in wire gauges, length and the presence of certain telephone apparatus connected to the line, the selection of a proper impedance 19 becomes problematic. For example, in residential terminals, a single sidetone balancing impedance 19 is usually provided in a telephone set. With only one such balancing impedance, the sidetone performance of the telephone set is severely compromised for some loop and termination impedance conditions which, in the worst case, leads to customer complaints.

A different problem occurs in business terminals where sometimes two sidetone balancing impedances of different value are provided in the telephone set. Selection between the available balancing impedances is provided by means of a "PBX/CO" switch, not shown, which is located under the telephone set for the user's convenience. Unfortunately, the end user often selects a balancing impedance which provides the highest sidetone. In noisy room conditions and with low level incoming receive signals, high sidetone levels can lead to masking of voice signals from the call initiator, thereby making it difficult to carry out a conversation.

Figure 2:
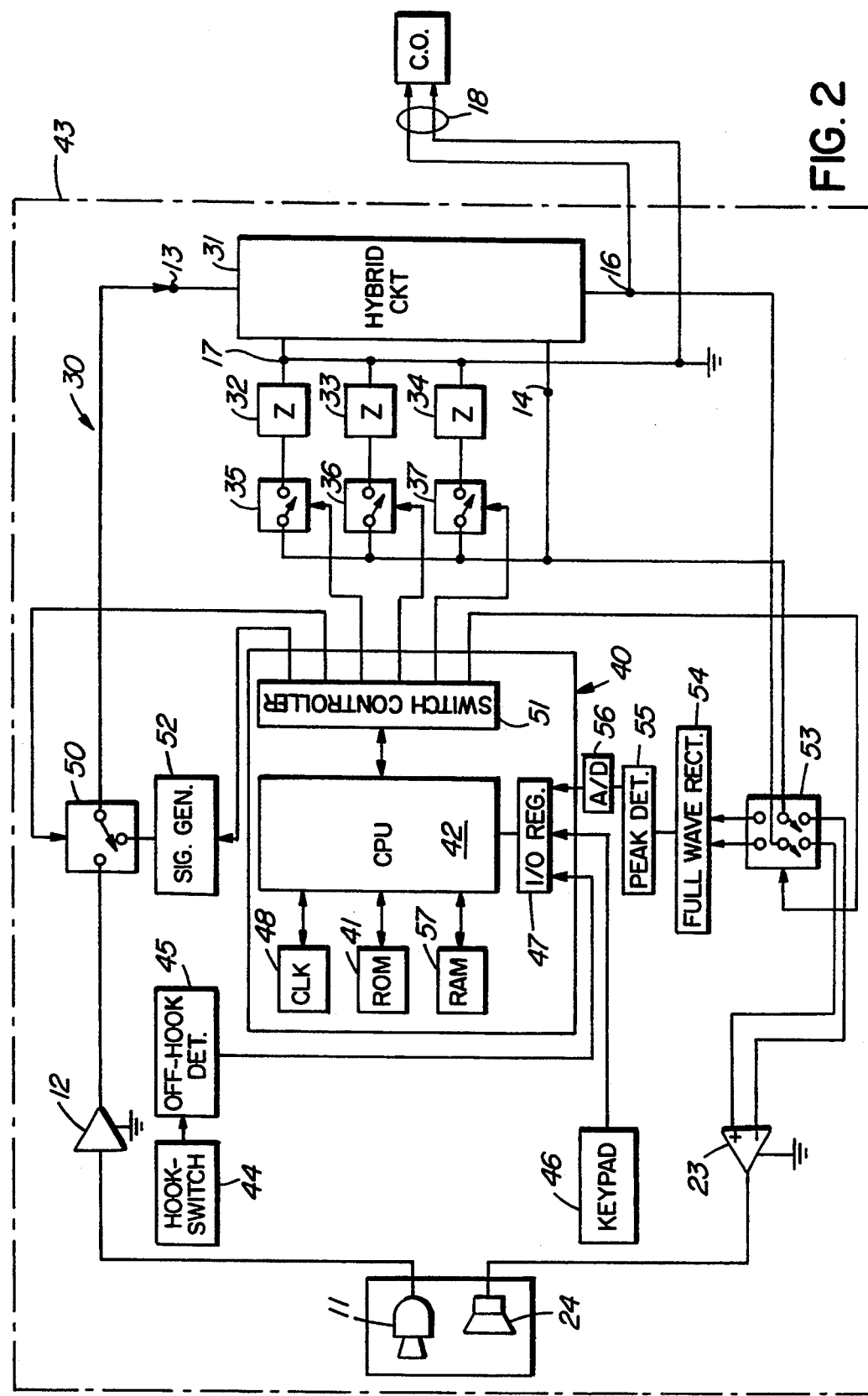
FIG. 2 is a block diagram of apparatus for adjusting sidetone in a telephone set according to the invention.

The known problems associated with sidetone as discussed with regard to FIG. 1 are substantially resolved by reference to the invention hereinbelow disclosed and in particular by an embodiment of a best known mode of an automatic sidetone selector circuit 30 which is illustrated in FIG. 2 in detailed block diagram form. It will be understood that the set 10 of FIG. 1 is embodied in the circuit 30 of FIG. 2. Accordingly, like circuit components carry the same numerical designations in both figures. However, in order to simplify the illustration of the circuit 30 the bridge circuit 15 is represented in block diagram form as a four-to-two wire hybrid circuit 31. Furthermore, in place of the single balancing impedance 19 of FIG. 1, FIG. 2 shows a plurality of such balancing impedances which are disclosed as balance impedance networks 32, 33 and 34. Although specific components and values are not shown, the construction of such networks would be known to those skilled in the art having access to data related to network surveys conducted by telephone companies. Data selected from such surveys would therefore be used in designing suitable networks that could be connected in various series-parallel combinations to provide, in effect, a pool of impedance networks. Such networks may be drawn upon to acquire an empirically selected circuit 31 balance that will provide an objective selection of a sidetone signal having a predetermined value. For purposes of disclosure simplification, however, the networks 32, 33, 34 are described as being switchably selectable only individually or in parallel combinations to avoid the complexity of a series-parallel switching system. As illustrated in FIG. 2, analog single-pole, single-throw switches 35, 36 and 37 are used to select corresponding ones of the networks 32, 33, 34 and will be described in greater detail in the description to follow.

Figure 3:
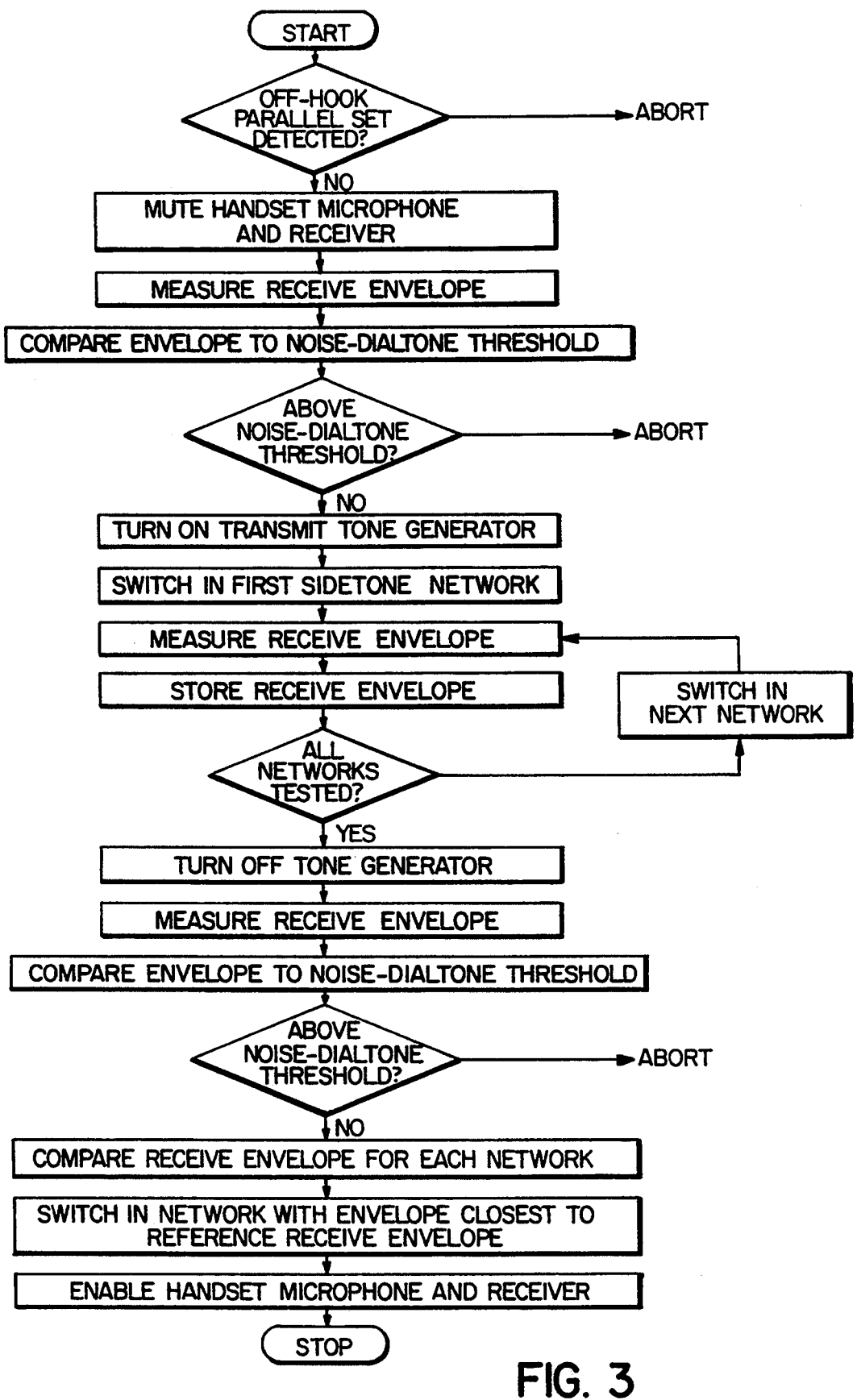
FIG. 3 is a flow diagram of a sidetone network selection algorithm operable via the apparatus of FIG. 2.

The circuit 30 of FIG. 2 functions as an automated sidetone balance network under control of a microcontroller 40 enabled by an operating program illustrated in FIG. 3 as a flow diagram of a sidetone network selection algorithm. The algorithm is digitally encoded as a set of instructions in a non-volatile ROM memory 41 that is accessed by a central processing unit (CPU) 42. An attempt will be made to execute the algorithm under the following conditions:

(a) the algorithm has not been successfully executed since the last off-hook, link or release of a telephone set 43;

(b) at least one digit has been dialed since the last off-hook, link or release and a dial buffer (not shown) of the set 43 is empty;

(c) there are no parallel sets off-hook;

(d) less than eight bytes of dial buffer have been processed since the last off-hook; and (e) there are no digits waiting to be dialed from the dial buffer or from a dial memory (not shown) of the set 43.

Execution of the algorithm begins when a hookswitch 44 is sensed in an off-hook condition by a detector 45 and a keypad 46 dials at least one digit. Enabling outputs from both the detector 45 and the keypad 46 are input through an input/output register 47 to the CPU 42 to start the algorithm and an asynchronous clock 48 operating at a rate of about 895 kHz functions as its time base.

As indicated in FIG. 3, execution of the algorithm is aborted in the event that a parallel telephone set (not shown) is ascertained to be off-hook by an off-hook parallel set detector (not shown). In this event, a fixed predetermined impedance (not shown) is connected to the terminals 14 and 17 for the duration of the telephone call.

Initially, the algorithm of FIG. 3 mutes the transmitter 11 to avoid possible corruption of a received sidetone signal. Concurrently the receiver 24 is muted to render it transparent to the user. Muting is achieved by disconnecting these components from the telephone side of the circuit 31. As illustrated in FIG. 2, an analog single-pole, double-throw switch 50 opens the voice signal path from the amplifier 12 to the terminals 13 and 17 of the circuit 31.

Under control of a switch controller 51, an analog double-pole, double-throw switch 53 disconnects the inputs of the amplifier 23 from the terminals 14 and 16 of the receive signal path as shown. The receive signal output from the terminals 14 and 16 is then connected by the switch 53 to a full-wave rectifier 54 having an output that is coupled to a peak voltage detector 55. An output from the detector 55 corresponds to the envelope of the incoming signal which is then input to the register 47 via an analog/digital converter 56 and is stored as digitally encoded data in a volatile memory shown as a RAM 57.

Subsequent to the dial tone and noise signal test, and in the absence of both dial tone and noise signals, the controller 51 operates the switch 50 to connect the output of a tone signal generator 52 across the terminals 13 and 17. Accuracy of circuit 30 operation requires a sinusoidal tone signal in a frequency range of from about 2000 Hz to 2500 Hz with a preferred value being 2200 Hz.

Continued execution of the algorithm also requires that any received dial tone and electrical noise signals not exceed a predetermined threshold value as tested and compared by the microprocessor 40. Thus, dial tone across the terminals 14 and 16 exceeding the predetermined threshold value, stored digitally in the ROM 41, will register at the CPU 42 as a disabling input signal. Similarly, the CPU 42 is disabled in the event of line noise appearing across the terminals 14 and 16. In both instances, the CPU is disabled and the algorithm aborted to avoid an incorrect selection of a balance impedance network which otherwise would likely occur in the presence of either dial tone or high noise conditions on the line 18 exceeding the threshold value.

As described, the algorithm represented by the flow diagram of FIG. 3 functions during outgoing calls and only when there are no digits in a dial buffer or a dial memory, neither of which are shown, waiting to be signaled. Thus, the algorithm is executed exclusively during the idle intervals between dialed digits following the dial tone threshold and noise test. The algorithm is aborted if a new digit enters the dial buffer.

A first envelope reading taken by the detector 55 corresponds to the sidetone signal received when the network 32 is switched across the terminals 14 and 17 by the switch 35. Subsequently, the networks 33 and 34 are sequentially switched across the terminals 14 and 17 by means of their respective switches 36 and 37 and corresponding sidetone readings by the detector 55 are detected and stored in the RAM 57.

Following sidetone testing using individual ones and parallel combinations of the networks 32, 33, 34 and storage of related envelope data, the generator 52 is disconnected from the circuit 31 with the transmitter 12 being muted. The receive envelope is then measured a second time in the same manner as previously described to ascertain the presence of dial tone or noise signals exceeding the threshold reference value stored in the RAM 57.

Upon successful completion of the second dial tone-noise signal test, execution of the algorithm continues with a comparison of the stored detected readings of the receive envelope for the various networks 32, 33, 34 tested. In this manner, incremental impedance values represented by the networks 32, 33, 34 switched across the terminals 14 and 17 may be selected to provide a preferred sidetone. It is this value of balance impedance which is automatically selected by means of the invention that provides the best sidetone performance for a telephone loop to which the set 43 is connected. The selected network 32, 33, 34 or parallel combination thereof is switched across the terminals 14 and 17 and remains connected until initiation of a subsequent call that may require a change in the balance impedance to maintain the best sidetone performance. Following selection of the network, the transmitter 12 and receiver 23 are enabled by reconnection into respective transmit and receive paths by the switches 50 and 53.

To those skilled in the art to whom this specification is addressed, it will be apparent that the embodiment aforedescribed may be varied to meet particular specialized requirements without departing from the true spirit and scope of the invention disclosed. For example, whereas FIG. 2 illustrates three balance impedance networks 32, 33, 34, additional networks and corresponding switches may be used to provide a wider range of balance impedances that would permit a more accurate adjustment of sidetone levels. Moreover, although single-pole, single-throw switches 35, 36, 37 are shown for switching the networks 32, 33, 34 individually or in parallel combinations, it is possible to provide a more complex switching arrangement that would permit series-parallel combinations of the networks 32, 33, 34. Also, although a microcontroller 40 including firmware is disclosed, a microprocessor or a personal computer may be readily substituted. Furthermore, although a tone signal generator 52 having a fixed frequency is described, the generator could produce a signal comprising an average of a selected band of frequencies or could even comprise a white noise generator. The embodiment described, therefore, is not to be taken as indicative of the limits of the invention but rather as an exemplary structure thereof which is described by the claims appended hereto.

The embodiments of the invention in which an exclusive property or privilege is claimed are defined as follows:

1. Apparatus for automatically adjusting sidetone to an optimum value in a first telephone station set including a keypad for dialing digits, a transmitter and a receiver switchably connectable via respective signal paths to a telephone side of a hybrid balance circuit having a line side connected to a telephone central office, comprising in combination:

means for muting the transmitter and receiver;

means for detecting the presence of any dial tone and noise signals in the muted receiver signal path;

means for injecting a tone signal into the transmitter signal path in the absence of any dial tone and noise signals or when any such detected signals are less than a predetermined threshold value;

impedance means operably connectable to the telephone side of the balance circuit in incrementally adjustable steps for matching a telephone line connecting the line side of the balance circuit to the central office;

means for generating an envelope of the tone signal in the receiver signal path corresponding to a sidetone value for each incremental impedance adjustment;

means for storing the respective envelopes of the tone signals as data in volatile memory means and comparing each stored envelope with a predetermined reference value; and means responsive to a best match between the compared envelopes and reference value for selectively connecting the correspondingly adjusted impedance across the telephone side of the balance circuit, thereby matching the telephone line and setting the sidetone to the optimum value.

2. Apparatus as claimed in claim 1, further comprising means for detecting the presence of an offhook second telephone station set connected in parallel with the first set and disabling the apparatus in response thereto.

3. Apparatus as claimed in claim 2, further comprising means for enabling the apparatus exclusively during an inter-digit dialing pause.

4. Apparatus as claimed in claim 3, further comprising means for connecting a fixed predetermined impedance across the telephone side of the balance circuit for the duration of a telephone call when the offhook second telephone set is connected in parallel with the first telephone set.

5. Apparatus as claimed in claim 4, wherein the incrementally adjustable impedance means comprise a plurality of balance impedance networks selectively connectable to the telephone side of the balance circuit.

6. Apparatus as claimed in claim 5, wherein the muting means include switch means operably responsive to control means for connecting selected ones of the impedance networks to the balance circuit.

7. Apparatus as claimed in claim 6, further comprising control means for selectively operating the switch means.

8. Apparatus as claimed in claim 7, wherein the control means for selectively operating the switch means comprise a microprocessor having non-volatile memory means storing digitally encoded instructions for effecting control of the switch means.

9. Apparatus as claimed in claim 8, wherein the microprocessor further comprises clock means for asynchronously executing the stored instructions.

10. Apparatus as claimed in claim 9, wherein the memory means comprise firmware.

11. Apparatus as claimed in claim 10, wherein the balance circuit comprises a four-arm bridge circuit adapted to operate with alternating currents.

12. Apparatus as claimed in claim 11, wherein the bridge circuit includes a branch having a pair of test terminals to which selected ones of the impedance networks are connected.

13. Apparatus as claimed in claim 12, wherein the bridge circuit includes a pair of signal source terminals for connection across a signal output of the transmitter.

14. Apparatus as claimed in claim 13, wherein the bridge circuit further includes a pair of signal receive terminals for connection across a signal input of the receiver.

15. Apparatus as claimed in claim 14, wherein the muting means further include a first switch for selectively connecting the transmitter and tone signal generator across the source terminals, a second switch for selectively connecting the receiver and detection means across the signal receive terminals and a plurality of third switches for connecting individual ones of the balance impedance networks across the test terminals.

16. Apparatus as claimed in claim 15, wherein the detection means comprise a full-wave rectifier having an output terminal and a peak signal voltage detector connected thereto.

17. Apparatus as claimed in claim 16, wherein the tone signal generator operates at a fixed frequency in the range of from 2000 Hz to 2500 Hz.

18. A method for automatically adjusting sidetone to an optimum value in a telephone station set including a keypad for dialing digits, a transmitter and a receiver switchably connectable via respective signal paths to a telephone side of a hybrid balance circuit having a line side connected to a telephone central office, comprising the steps of:

muting the transmitter and receiver;

detecting the presence of any dial tone and noise signals in the muted receiver signal path;

injecting a tone signal into the transmitter signal path in the absence of any dial tone and noise signals or when any such detected signals are less than a predetermined threshold value;

operably connecting impedance means to the telephone side of the balance circuit in incrementally adjustable steps for matching a telephone line connecting the line side of the balance circuit to the central office;

generating an envelope of the tone signal in the receiver signal path corresponding to a sidetone value for each incremental impedance adjustment;

storing the respective envelopes of the tone signals as data in volatile memory means and comparing each stored envelope with a predetermined reference value; and connecting across the telephone side of the balance circuit the adjusted impedance that corresponds to a best match detected between the compared envelopes and reference value, thereby matching the telephone line and setting the sidetone to the optimum value.

19. A method as claimed in claim 18, comprising the step of detecting an off-hook condition in the station set before the step of muting the transmitter and receiver and injecting the tone signal.

20. A method as claimed in claim 19 comprising the step of injecting the tone signal only during idle intervals between dialed digits.

21. A method as claimed in claim 19, comprising the step of testing for the presence of a receive envelope corresponding to either dial tone or line noise exceeding a predetermined threshold value and aborting the method when present before the step of injecting the tone signal.

22. A method as claimed in claim 18, wherein the tone signal generator operates at a fixed frequency in the range of from 2000 Hz to 2500 Hz.

* * * * *

UNITED STATES PATENT AND TRADEMARK OFFICE
CERTIFICATE OF CORRECTION

PATENT NO. : 5,398,282  Page 1 of 2
DATED : March 14, 1995
INVENTOR(S) : Christopher M. Forrester; David A. Pepper; Guy J. Fortier; Norbert J. Diesing; W. J. Leonard McCready It is certified that error appears in the above-indentified patent and that said Letters Patent is hereby corrected as shown below:

In the ABSTRACT, lines 3 and 4, delete:

" and cancel the phase "to a predetermined value", ".

Delete the unnumbered prior art drawing appearing on the first page and replace with FIG. 2 of the drawings, as shown on the attached page.

Signed and Sealed this

Seventh Day of July, 1998

*Attest:*

BRUCE LEHMAN

*Attesting Officer*  *Commissioner of Patents and Trademarks*

United States Patent
Forrester et al.

Patent Number: 5,398,282
Date of Patent: Mar. 14, 1995

[54] AUTOMATIC SIDETONE SELECTOR

[75] Inventors: Christopher M. Forrester, Ottawa; David A. Pepper, Kemptville; Guy J. Fortier; Norbert J. Diesing, both of Kanata; W. J. Leonard McCready, Carp, all of Canada

[73] Assignee: Northern Telecom Limited, Montreal, Canada

[21] Appl. No.: 40,850

[22] Filed: Mar. 31, 1993

[30] Foreign Application Priority Data

Dec. 31, 1992 [CA] Canada ............................ 2086573

[51] Int. Cl.⁶ .................................................. H04M 1/00
[52] U.S. Cl. .................................. 379/391; 379/410; 379/407; 379/406; 379/390
[58] Field of Search .............. 379/391, 392, 390, 410, 379/407

[56] References Cited
U.S. PATENT DOCUMENTS

| | | | |
|---|---|---|---|
| 4,996,710 | 2/1991 | Takahashi et al. | 379/202 |
| 5,029,203 | 7/1991 | Ikefuji et al. | 379/391 |
| 5,133,007 | 7/1992 | Nishimura | 379/405 |
| 5,191,606 | 3/1993 | Juang | 379/391 |

*Primary Examiner*—James L. Dwyer
*Assistant Examiner*—Jacques M. Saint-Surin
*Attorney, Agent, or Firm*—Michael M. Sakovich

[57] ABSTRACT

Sidetone in a four-wire telephone station set that is coupled to a two-wire telephone line through a four-to-two wire hybrid circuit is automatically and cancel the phase "to a predetermined value", set by incrementally adjusting a balancing impedance connected to the circuit until an optimum impedance match between the telephone set and line is achieved. Under software control, during idle intervals between dialed digits when a call is initiated, a microcontroller mutes the telephone transmitter and receiver on the telephone side of the circuit and substitutes for these components a tone signal generator to produce a sidetone signal that is applied to a full-wave rectifier and therefrom to a peak voltage detector to generate a sidetone envelope. Individual ones of several impedance balancing networks are then sequentially connected to the telephone side of the circuit and the sidetone envelope for each balancing impedance is digitally encoded and stored. A mutual comparison of the stored data indicates a minimum sidetone value which corresponds to an optimum impedance match that is retained unless a subsequent telephone call results in a change of balancing impedance.

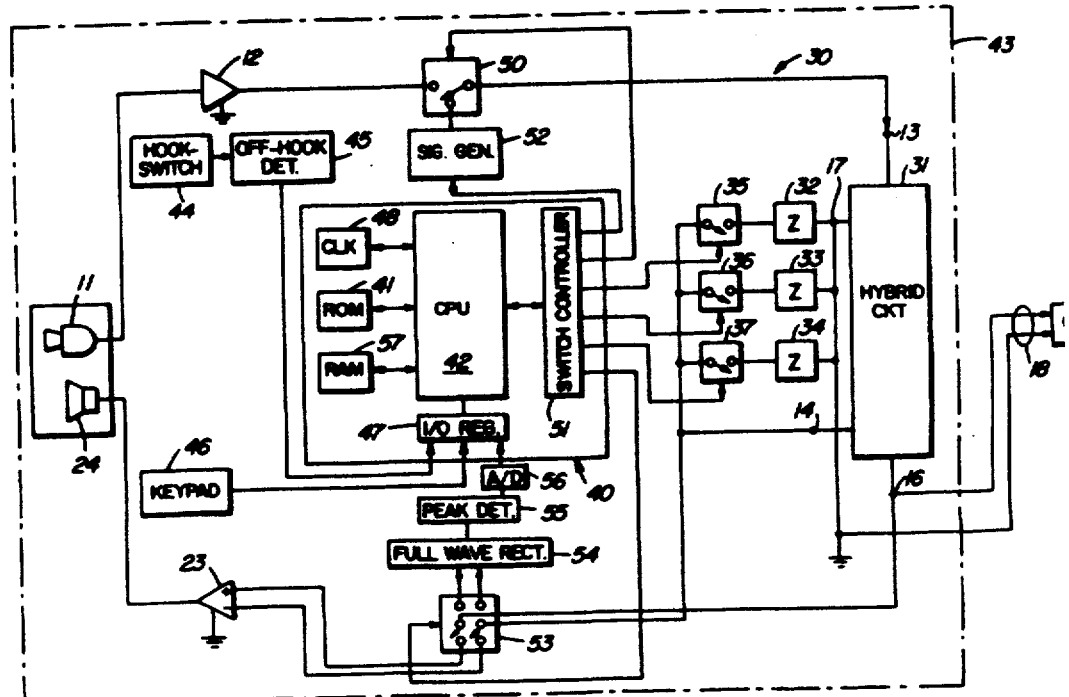

22 Claims, 3 Drawing Sheets